(12) United States Patent
Tian

(10) Patent No.: US 11,502,535 B2
(45) Date of Patent: Nov. 15, 2022

(54) CHARGING CIRCUIT FOR ELECTRONIC DEVICE, CHARGING METHOD, AND ELECTRONIC DEVICE

(71) Applicant: GUANGDONG OPPO MOBILE TELECOMMUNICATIONS CORP., LTD., Guangdong (CN)

(72) Inventor: Chen Tian, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 280 days.

(21) Appl. No.: 16/893,006

(22) Filed: Jun. 4, 2020

(65) Prior Publication Data
US 2020/0303927 A1 Sep. 24, 2020

Related U.S. Application Data

(63) Continuation of application No. PCT/CN2019/076556, filed on Feb. 28, 2019.

(51) Int. Cl.
*H02M 3/07* (2006.01)
*H02J 7/00* (2006.01)

(52) U.S. Cl.
CPC ............ *H02J 7/007* (2013.01); *H02M 3/07* (2013.01)

(58) Field of Classification Search
CPC ......... H02J 7/007; H02J 2207/20; H02M 3/07
See application file for complete search history.

(56) References Cited

U.S. PATENT DOCUMENTS

| 2001/0017565 | A1  | 8/2001 | Zanuccoli et al. |
| 2007/0159233 | A1  | 7/2007 | Sohara |
| 2018/0034308 | A1* | 2/2018 | Burkhart ............... H02J 7/042 |
| 2018/0076635 | A1  | 3/2018 | Maalouf et al. |
| 2018/0083458 | A1* | 3/2018 | Huang ................. H02J 7/345 |
| 2018/0115246 | A1* | 4/2018 | Azrai ................... H02M 3/335 |

FOREIGN PATENT DOCUMENTS

| CN | 101394094 | 3/2009 |
| CN | 101779374 | 7/2010 |
| CN | 204518162 | 7/2015 |
| CN | 105244970 | 1/2016 |

(Continued)

OTHER PUBLICATIONS

SIPO, Notification to Grant Patent Right for Invention for CN Application No. 201980003862.0, dated Apr. 8, 2021.
(Continued)

*Primary Examiner* — Sibin Chen
(74) *Attorney, Agent, or Firm* — Hodgson Russ LLP

(57) ABSTRACT

Provided are a charging circuit for an electronic device, a charging method, an electronic device, and a storage medium. The charging circuit includes a control module, a charge pump, and a battery assembly. The control module is configured to generate a first control signal upon determining that a power adaptor connected is an adaptor for direct charging with high voltage. The charge pump is configured to, upon receiving the first control signal, directly apply a charging voltage to the battery assembly for direct charging, where the charging voltage is applied to the electronic device by the power adaptor.

17 Claims, 6 Drawing Sheets

(56) References Cited

FOREIGN PATENT DOCUMENTS

| | | | |
|---|---|---|---|
| CN | 105896959 | | 8/2016 |
| CN | 107086616 | | 8/2017 |
| CN | 107947252 | | 4/2018 |
| CN | 108124498 | | 6/2018 |
| CN | 108233460 | | 6/2018 |
| JP | 2010252540 | | 11/2010 |
| JP | 2018064448 | | 4/2018 |
| WO | 2011016463 | | 2/2011 |
| WO | WO/2011/016463 | * | 2/2011 |

OTHER PUBLICATIONS

EPO, Extended European Search Report for EP Application No. 19916792.5, dated Mar. 30, 2021.
EPO, Communication for EP Application No. 19916792.5, dated Sep. 23, 2021.
WIPO, English Translation of ISR for PCT/CN2019/076556, Dec. 9, 2019.
SIPO, First Office Action for CN Application No. 201980003862.0, dated Jan. 12, 2021.
IPI, Office Action for IN Application No. 202017036027, dated Dec. 28, 2020.
EPO, Communication for EP Application No. 19916792.5, dated Mar. 25, 2022.
IPI, Hearing Notice for IN Application No. 202017036027, dated Mar. 4, 2022.

* cited by examiner

CHARGING CIRCUIT FOR ELECTRONIC DEVICE, CHARGING METHOD, AND ELECTRONIC DEVICE

CROSS-REFERENCE TO RELATED APPLICATION

This application is a continuation of International Application No. PCT/CN2019/076556, filed Feb. 28, 2019, the entire disclosure of which is incorporated herein by reference.

TECHNICAL FIELD

This disclosure relates to electronic technology, including, but not limited to, a charging circuit for an electronic device, a charging method, an electronic device, and a storage medium.

BACKGROUND

With development of electronic technology, electronic devices (such as mobile phones) can meet various requirements in people's daily life and work, and therefore people are increasingly dependent on the electronic device. However, frequent use of the electronic device increases power consumption speed of the electronic device, which makes the electronic device be frequently charged. Therefore, how to improve charging efficiency of the electronic device has become one of the concerns.

SUMMARY

In a first aspect, a charging circuit for an electronic device is provided. The charging circuit includes a control module and a charge pump. The control module is configured to generate a first control signal upon detecting that a power adaptor connected is an adaptor for direct charging with high voltage. The charge pump is configured to, upon receiving the first control signal, directly apply a charging voltage to a battery assembly of the electronic device for direct charging, where the charging voltage is applied to the electronic device by the power adaptor.

In a second aspect, a charging method is provided. The method includes the following. A type of a power adaptor coupled with an electronic device is determined, where the type comprises: an adaptor for direct charging with high voltage, and an adaptor for direct charging with low voltage. A first control signal is generated upon detecting that a power adaptor is an adaptor for direct charging with high voltage. A charge pump of a charging circuit is controlled according to the first control signal to be switched on, to directly apply a charging voltage to a battery assembly for direct charging, where the charging voltage is applied to the electronic device by the power adaptor.

In a third aspect, an electronic device is provided. The electronic device includes a battery assembly, a control module, and a charge pump. The control module is configured to determine a type of a power adaptor connected with the electronic device and generate a first control signal upon determining that a power adaptor connected is an adaptor for direct charging with high voltage, wherein the type comprises: the adaptor for direct charging with high voltage, and an adaptor for direct charging with low voltage. The charge pump is configured to, upon receiving the first control signal, directly apply a charging voltage from the power adaptor to the battery assembly for direct charging, wherein the charging voltage is applied to the electronic device by the power adaptor.

DETAILED DESCRIPTION

The following will describe the technical solutions of implementations in further detail with reference to the accompanying drawings and implementations.

Implementations provide a charging circuit for an electronic device. In general, the electronic device can be a mobile phone, a tablet computer, a desktop, a personal digital assistant (PDA), a global positioning system (GPS), a digital telephone, a video telephone, a television, a sensor device, etc.

Figure 1A:
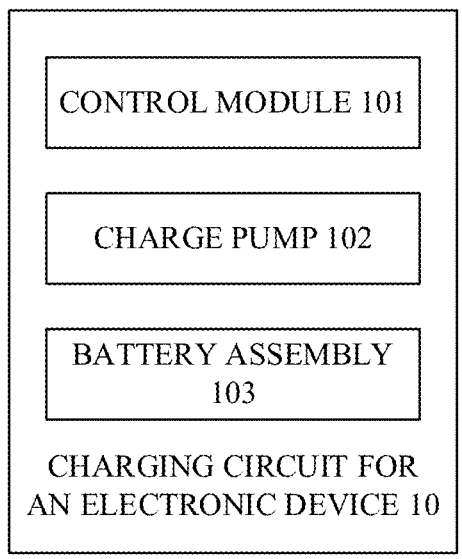
FIG. 1A is a schematic structural diagram of a charging circuit for an electronic device according to implementations.

FIG. 1A is a schematic structural diagram of a charging circuit for an electronic device according to implementations. As illustrated in FIG. 1A, the charging circuit 10 includes a control module 101, a charge pump 102, and a battery assembly 103.

The control module 101 is configured to generate a first control signal upon detecting that a power adaptor connected is an adaptor for direct charging with high voltage (for example, 9V), or generate a second control signal upon detecting that the power adaptor is an adaptor for direct charging with low voltage (for example, 5V). The first control signal is for controlling the charge pump 102 to be switched on in such a manner that a charging voltage is directly applied to the battery assembly 103 for direct charging, where the charging voltage is applied to the electronic device by the power adaptor. The second control signal is for controlling the charge pump 102 to perform boost conversion on the charging voltage and apply the charging voltage subjected to the boost conversion to the battery assembly 103 for charging.

In practice, the power adaptor can be electrically coupled with the charge pump 102 via a charging interface (such as, for example, a Type-C interface, a universal serial bus (USB) interface, etc.) of the electronic device.

Generally, the adaptor for direct charging with high voltage has a maximum output voltage that is higher than a voltage of the battery assembly (that is, a potential difference between a positive electrode and a negative electrode of the battery assembly). The adaptor for direct charging with low voltage has a maximum output voltage that is lower than the voltage of the battery assembly. The maximum output voltage of the adaptor for direct charging with low voltage is lower than that of the adaptor for direct charging with high voltage. In practice, as an example, the control module 101 can determine the type of the power adaptor as follows. The control module 101 determines that the power adaptor is the adaptor for direct charging with high voltage upon detecting that the charging voltage, which is applied to the electronic device by the power adaptor, is higher than a preset threshold voltage. The control module 101 determines that the power adaptor is the adaptor for direct charging with low voltage upon detecting that the charging voltage, which is applied to the electronic device by the power adaptor, is lower than or equal to the preset threshold voltage. As another example, after being electrically coupled with the electronic device, the power adaptor can send directly a communication signal to the control module 101 to notify the control module 101 of the type of the power adaptor.

The charge pump 102 is configured to operate as follows. The charge pump 102 is configured to, upon receiving the first control signal, directly apply the charging voltage to the battery assembly 103 for direct charging, where the charging voltage is applied to the electronic device by the power adaptor. The charge pump 102 is configured to perform, upon receiving the second control signal, boost conversion on the charging voltage and apply the charging voltage subjected to the boost conversion to the battery assembly 103 for charging. The battery assembly 103 includes at least one cell.

Figure 1B:
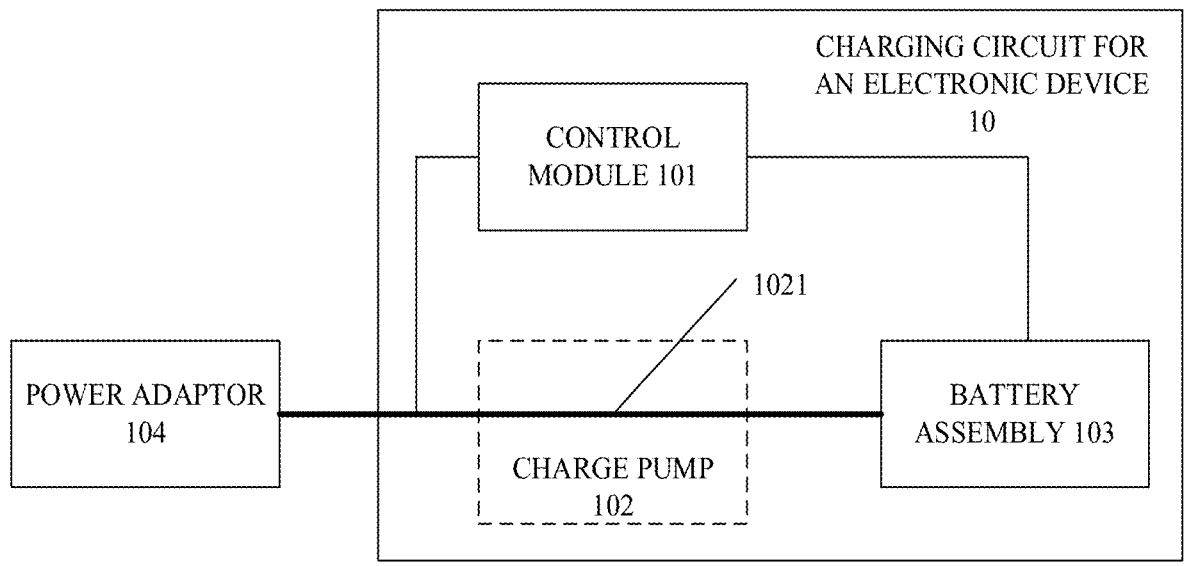
FIG. 1B is a schematic structural diagram of a charging circuit for an electronic device according to other implementations.

For example, as illustrated in FIG. 1B, upon receiving the first control signal, the charge pump 102 can directly switch on a line 1021 in which only a switch component(s) is provided, such that the charging voltage applied to the electronic device by the power adaptor 104 is directly applied to the battery assembly 103 for direct charging. In other words, if the power adaptor electrically coupled with the electronic device is the adaptor for direct charging with high voltage, a direct-charging path 1021 of the charge pump 102 will be switched on, and as such, the charge pump 102 will directly apply the charging voltage to the battery assembly for direct charging. The direct-charging path 1021 can be provided with only switch components, such that there is no other power consuming components.

In general, when the battery assembly 103 is charged with the adaptor for direct charging with high voltage, the charge pump is in a circuit state which is referred to as a bypass mode. In the bypass mode, the charging voltage is directly applied to the battery assembly for charging without boost conversion. When the battery assembly 103 is charged with the adaptor for direct charging with low voltage, the charge pump 102 is in a circuit state which is referred to as a boost conversion mode. In the boost conversion mode, the charge pump first performs boost conversion on the charging voltage and then applies the charging voltage subjected to the boost conversion to the battery assembly for charging.

It can be understood that, a conventional charge pump is operable only in the boost conversion mode. In other words, the conventional charge pump works only when the power adaptor coupled with the electronic device is the adaptor for direct charging with low voltage. Upon detecting that the power adaptor coupled with the electronic device is the adaptor for direct charging with low voltage, the control module enables the charge pump. The charge pump, by utilizing charge storage capacity of capacitor components, generates an output voltage that is higher than an input voltage to perform boost conversion on the charging voltage applied to the electronic device by the adaptor for direct charging with low voltage, and applies the charging voltage subjected to the boost conversion to the battery assembly for charging. Upon detecting that the power adaptor coupled with the electronic device is the adaptor for direct charging with high voltage, the control module does not enable the charge pump. Instead, the control module switches a branch charging circuit on, which supports direct charging with high voltage, other than the charge pump, to achieve direct charging of the battery assembly. However, the above scheme has the following disadvantages. On one hand, to support the adaptor for direct charging with high voltage, extra devices and space are needed to build a circuit for direct charging with high voltage. On the other hand, compared with the charge pump, an extra circuit for direct charging with high voltage consumes more electrical energy during charging and therefore has a low electrical efficiency, which affects charging efficiency of the battery assembly.

Based on this, according to implementations, when the power adaptor is used as the adaptor for directly charging the battery assembly of the charging circuit with high voltage, the control module generates a first control signal and sends the first control signal to the charge pump. As such, the charge pump is triggered to, upon receiving the first control signal, directly apply the charging voltage to the battery assembly for direct charging without performing boost conversion or buck conversion on the charging voltage. Since the charge pump has a high electrical efficiency due to its low energy consumption in charging, by using the charge pump, the charging voltage can be directly applied to the battery assembly for direct charging with high voltage. This can not only decrease the number of devices required for the charging circuit and save space for the charging circuit, but also can achieve a high charging efficiency.

In some implementations, the charge pump 102 includes at least one switch component, such as, for example, M switch components. The charge pump 102 is configured to switch on M switch components in the charge pump 102 upon receiving the first control signal, such that the charging voltage passes through the M switch components to be applied to the battery assembly 103 for direct charging, where M is an integer greater than or equal to one. In other words, when the charging circuit 10 is operable with the adaptor for direct charging with high voltage through the charge pump 102, the charging voltage (which is applied to the electronic device by the power adaptor for direct charging with high voltage) passes only through the M switch components to be applied to the battery assembly for direct charging. Since the charge pump has a high electrical efficiency, by changing a working mode of the charge pump, the charge pump can be made operable with the adaptor for direct charging with high voltage. This can improve charging efficiency of the battery assembly in addition to decreasing the number of devices required for the charging circuit, and can reduce space for the charging circuit.

In some implementations, the switch component may be a metal-oxide-semiconductor field-effect transistor (MOSFET), a semiconductor diode, or a semiconductor triode.

There is no restriction on the type of the switch component in implementations. It should be noted that, the M switch components may be of the same model or of different models.

In some implementations, the charge pump 102 is configured to operate as follows. The charge pump 102 can be configured to, upon receiving the second control signal, perform boost conversion on the charging voltage by using capacitor components in the charge pump 102 and alternately switching on N switch components, in such a manner that an output voltage of the charge pump 102 (that is, the charging voltage subjected to the boost conversion) is higher than the charging voltage. The charge pump 102 is configured to apply the output voltage to the battery assembly 103 for charging, where N is an integer greater than or equal to one. In at least one implementation, N is an integer greater than or equal to two.

It should be noted that, the M switch components can be part of the N switch components, and N is an integer greater than or equal to M Therefore, the N switch components may be of the same model or of different models.

Figure 2A:
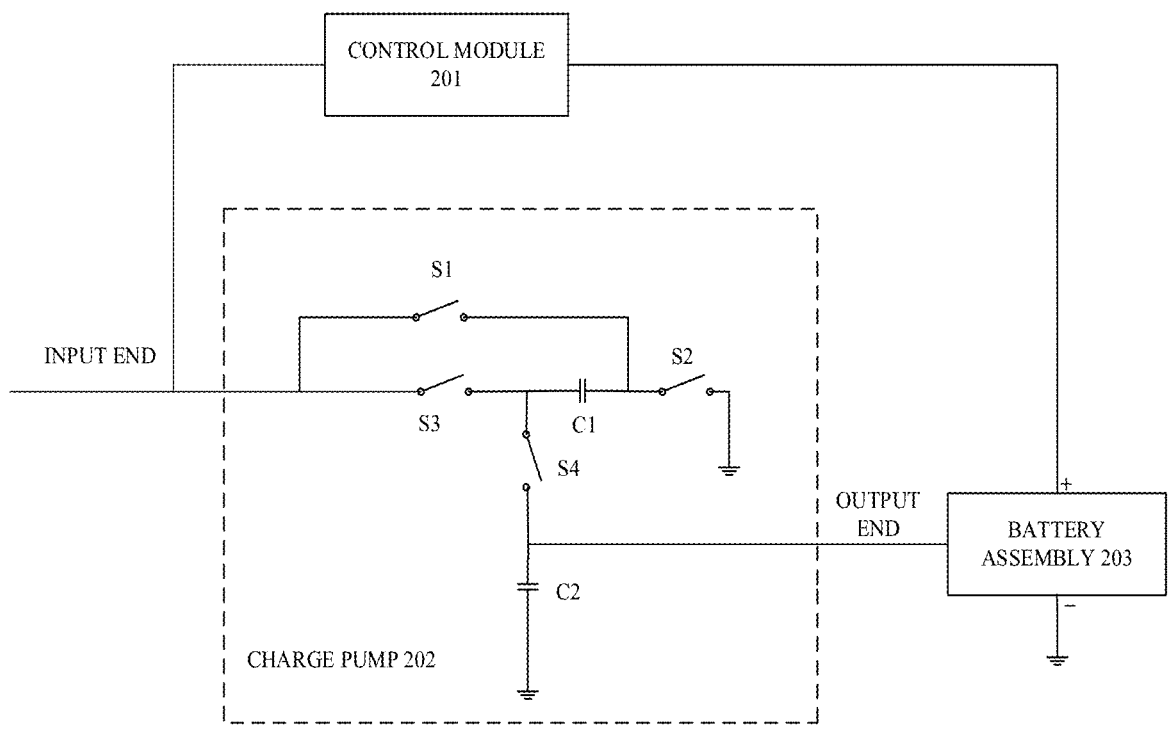
FIG. 2A is a schematic structural diagram of a charging circuit for an electronic device according to other implementations.

As an example, the charge pump 102 is a voltage doubler charge pump that can perform 2× boost conversion on the charging voltage applied to the electronic device by the power adaptor. In other words, under ideal conditions (that is, without taking into consideration power consumption of the charge pump during charging), the output voltage of the charging pump 102 after the boost conversion is twice the charging voltage (that is, an input voltage of the charge pump 102). FIG. 2A is a schematic structural diagram of a charging circuit for an electronic device according to other implementations. As illustrated in FIG. 2A, the charging circuit 20 includes a control module 201, a charge pump 202, and a battery assembly 203. The charge pump 202 includes a first switch component S1, a second switch component S2, a third switch component S3, a fourth switch component S4, a first capacitor component C1, and a second capacitor component C2.

An input end of the first switch component S1 and an input end of the third switch component S3 are used as an input end of the charge pump 202. It should be noted that the input end of the charge pump 202 can be coupled with one end of the control module 201, and the other end of the control module 201 can be coupled with the battery assembly 203, to achieve information interaction with the power adaptor in charging of the battery assembly by the power adaptor. For example, the control module 201 monitors in real time a charging state of each cell in the battery assembly 203 and informs the charging state to the power adaptor.

An output end of the first switch component S1 is coupled with an input end of the second switch component S2, and an output end of the second switch component S2 is grounded. An output end of the third switch component S3 is coupled with an input end of the first capacitor component C1 and an input end of the fourth switch component S4 respectively. An output end of the first capacitor component C1 is coupled with the input end of the second switch component S2. An output end of the fourth switch component S4 is used as an output end of the charge pump 202 and is coupled with an input end of the second capacitor component C2 and a positive electrode of the battery assembly 203 respectively. An output end of the second capacitor component C2 is grounded, and a negative electrode of the battery assembly 203 is grounded.

Based on the charging circuit 20 illustrated in FIG. 2A, the control module 201 is configured to generate a first control signal and send the first control signal to the charge pump 202 upon detecting that a power adaptor coupled with the charge pump 202 is an adaptor for direct charging with high voltage. The control module 201 is configured to generate a second control signal and send the second control signal to the charge pump 202 upon detecting that the power adaptor coupled with the charge pump 202 is an adaptor for direct charging with low voltage. In practice, the control module 201 may be a microcontroller unit (MCU).

Figure 2B:
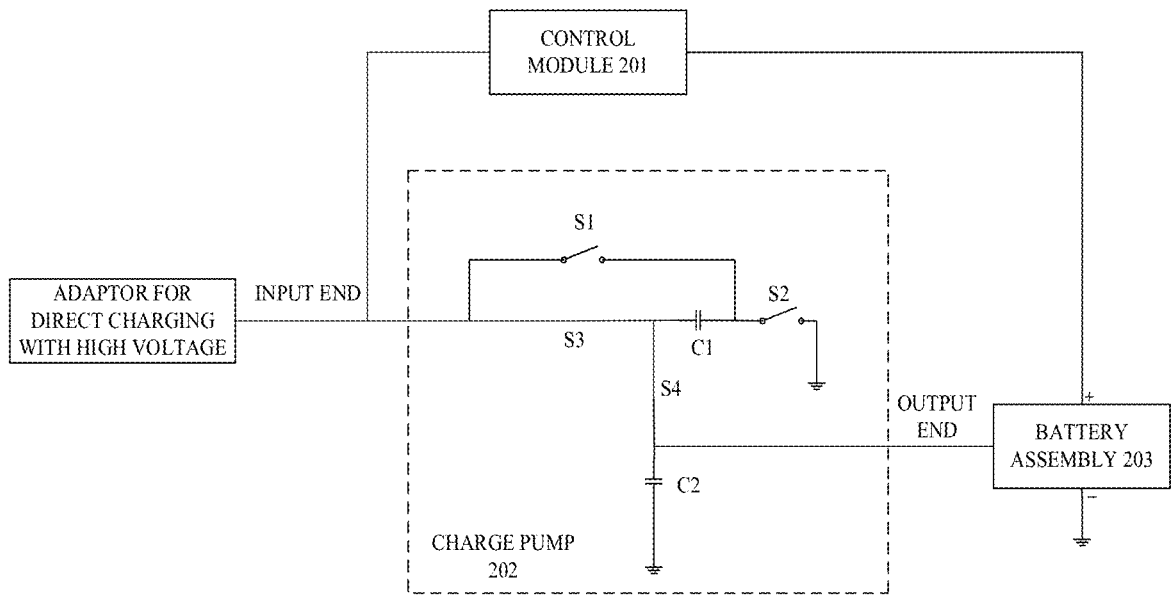
FIG. 2B is a schematic diagram illustrating principles of direct charging with high voltage by a charging circuit according to implementations.

As illustrated in FIG. 2B, the charge pump 202 is configured to switch off the first switch component S1 and the second switch component S2, and switch on the third switch component S3 and the fourth switch component S4 upon receiving the first control signal, such that the charging voltage passes through the third switch component S3 and the fourth switch component S4 to be applied to the battery assembly 203 for direct charging. In this way, in response to the first control signal, the charge pump is triggered to switch off the first switch component S1 and the second switch component S2 and switch on the third switch component S3 and the fourth switch component S4, such that the charge pump can be operable with the adaptor for direct charging with high voltage without introducing an extra circuit for direct charging with high voltage. In this way, for example, it is possible to decrease the number of devices required for the charging circuit, thereby improving charging efficiency.

In some implementations, the third switch component S3 and the second switch component S2 are used as a first set of components, and the first switch component S1 and the fourth switch component S4 are used as a second set of components. The charge pump 202 is configured to, upon receiving the second control signal, alternately switch on the first set of components and the second set of components at a preset time interval in such a manner that an output voltage of the charge pump 202 is higher than an output voltage of the power adaptor. The charge pump 202 is configured to apply the output voltage of the charge pump 202 to the battery assembly 203 for charging.

In general, a first duration for which the first set of components is on continuously and a second duration for which the second set of components is on continuously constitutes a charging cycle. In each charging cycle, the first duration is generally equal to the second duration. In other words, during charging of the battery assembly by the adaptor for direct charging with low voltage, in terms of on-off state, the first switch component S1, the second switch component S2, the third switch component S3, and the fourth switch component S4 of the charge pump each have a duty cycle of 50%.

Figure 2C:
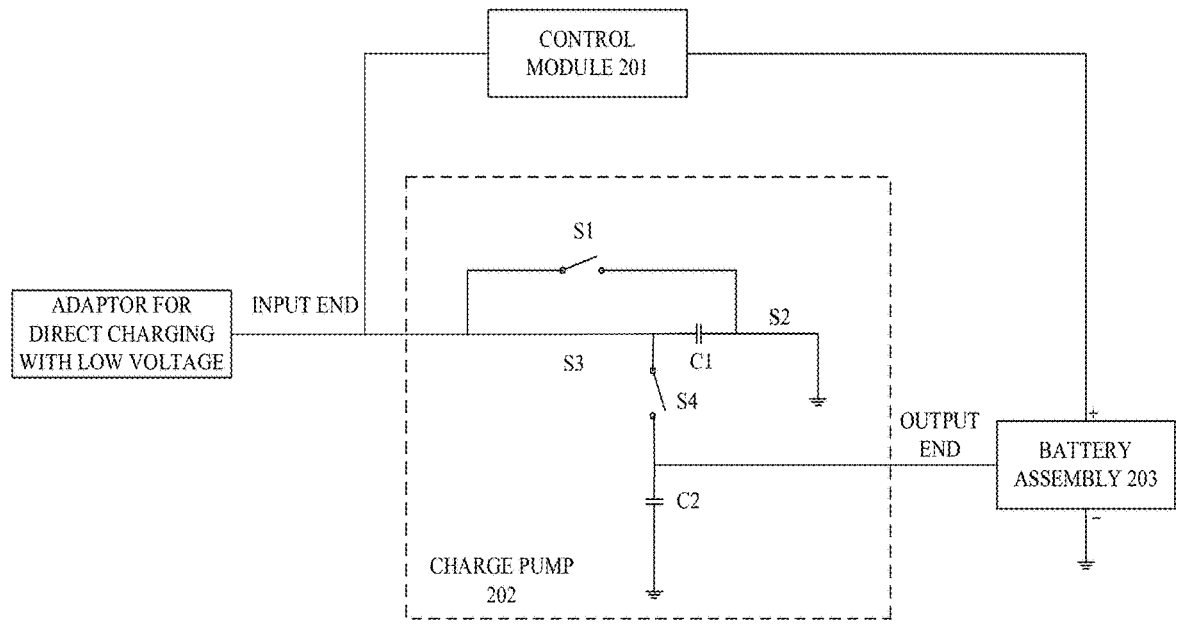
FIG. 2C is a schematic diagram illustrating principles of charging of capacitor components by a charging circuit according to implementations.
Figure 2D:
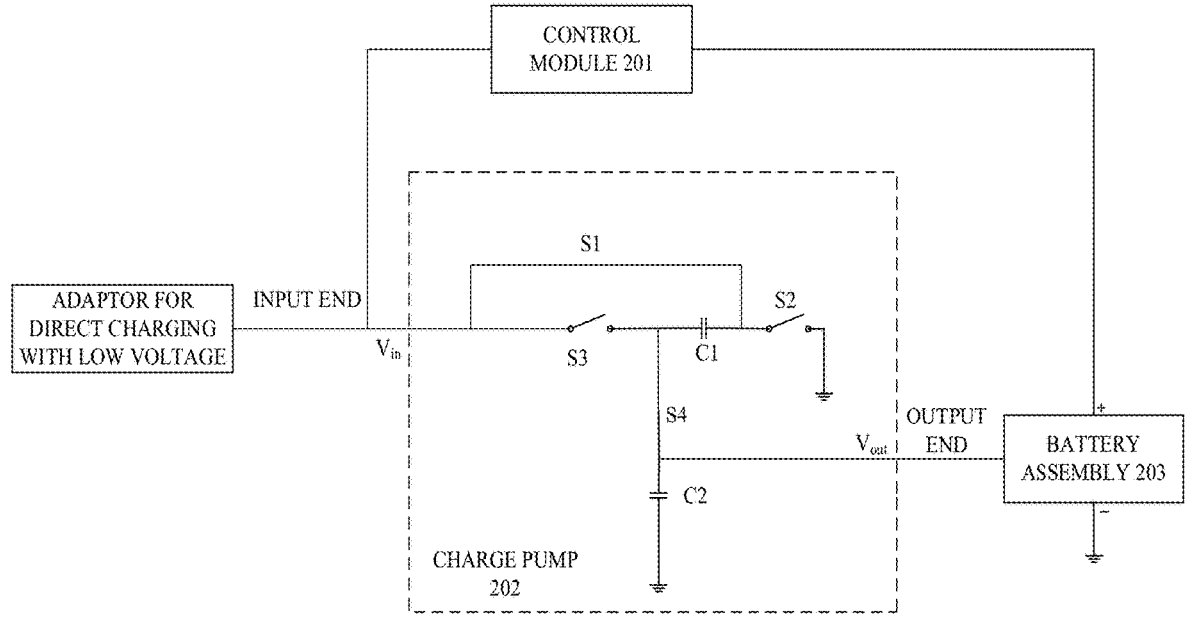
FIG. 2D is a schematic diagram illustrating principles of charging of a battery assembly by a charging circuit according to implementations.

It can be understood that, in one charging cycle, the first set of components is first switched on. As illustrated in FIG. 2C, S3 and S2 are in an on-state, and S1 and S4 are in an off-state. In this situation, the charging voltage applied to the electronic device by the power adaptor (that is, an input voltage of the charge pump $V_{in}$) passes through the third switch component S3 to be applied to the first capacitor component C1 for charging. When charging of the first capacitor component C1 is completed, an input voltage of C1 is equal to the input voltage of the charge pump $V_{in}$. Then the second set of components is switched on. As illustrated in FIG. 2D, S1 and S4 are in an on-state, and S2 and S3 are in an off-state. In this situation, without taking power consumption of the charge pump into consideration, the output voltage of the charge pump $V_{out}$ is equal to a sum of the input voltage of the charge pump and the input voltage of C1, that is, the output voltage of the charge pump is twice the input voltage of the charge pump.

According to implementations, working timings of switch components in the charge pump are changed, such that the charge pump can switch between the boost conversion mode and the bypass mode. For example, when the power adaptor coupled with the electronic device is the adaptor for direct charging with low voltage (that is, a power adaptor of which a maximum output voltage is lower than the voltage of the battery assembly), the boost conversion mode of the charge pump is enabled. When the power adaptor coupled with the electronic device is the adaptor for direct charging with high voltage (that is, a power adaptor of which a maximum output voltage is higher than the voltage of the battery assembly), the bypass mode of the charge pump is enabled.

Figure 3:
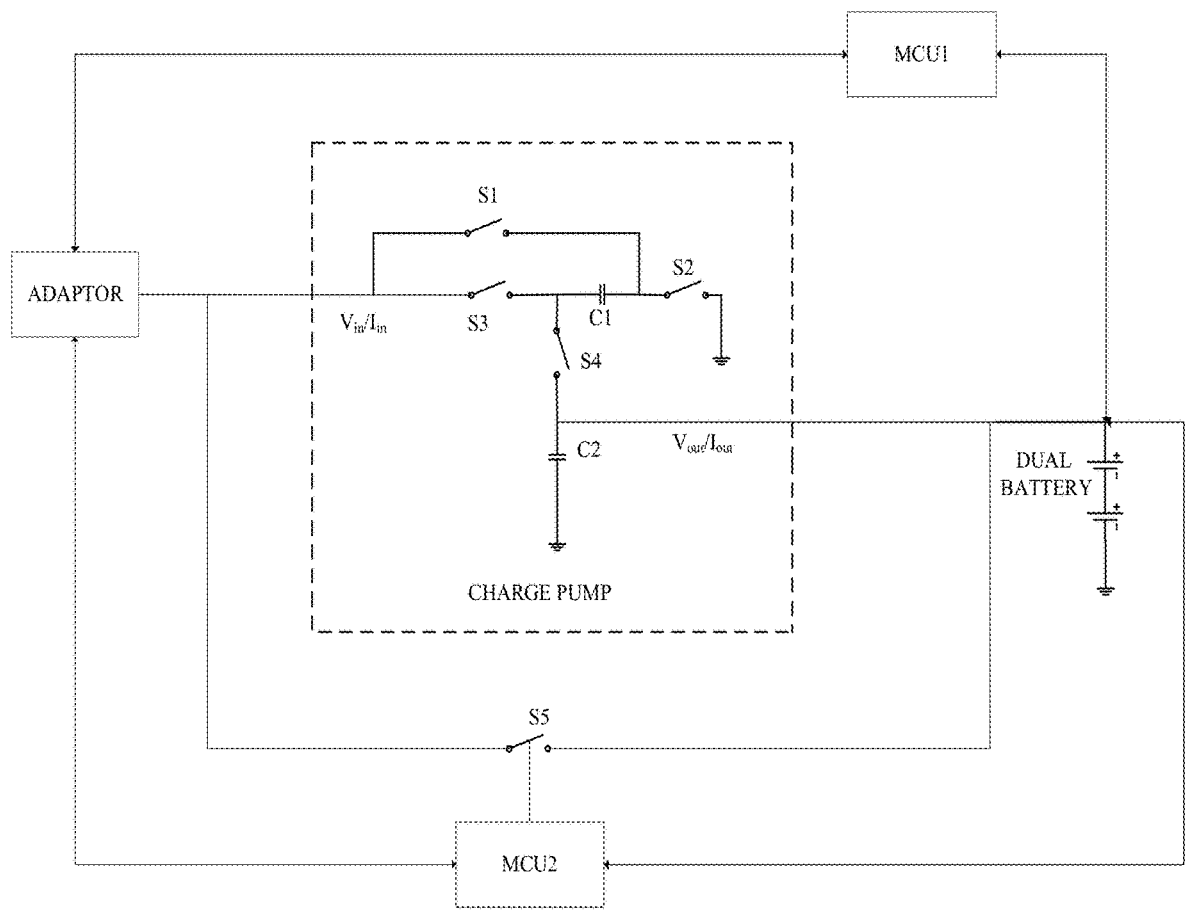
FIG. 3 is a schematic structural diagram of a charging circuit for an electronic device according to other implementations.

In other examples, if the charging circuit is required to charge the battery assembly with high voltage and low voltage, as illustrated in FIG. 3, the charging circuit generally includes a charge pump and a circuit for direct charging with high voltage, where the charge pump is configured for boost charging with an adaptor for charging with low voltage ("low-voltage" adaptor for short), and the circuit for direct charging with high voltage is configured to support charging functions of the adaptor for direct charging with high voltage. The circuit for direct charging with high voltage includes a switch component S5 (such as, for example, a pair of metal oxide semiconductors (MOS) which are back-to-back) and a microcontroller unit MCU2. MCU2 is configured to control S5 to be switched on or switched off. In this example, a large number of devices are needed for the charging circuit, and charging efficiency can be low.

Figure 4:
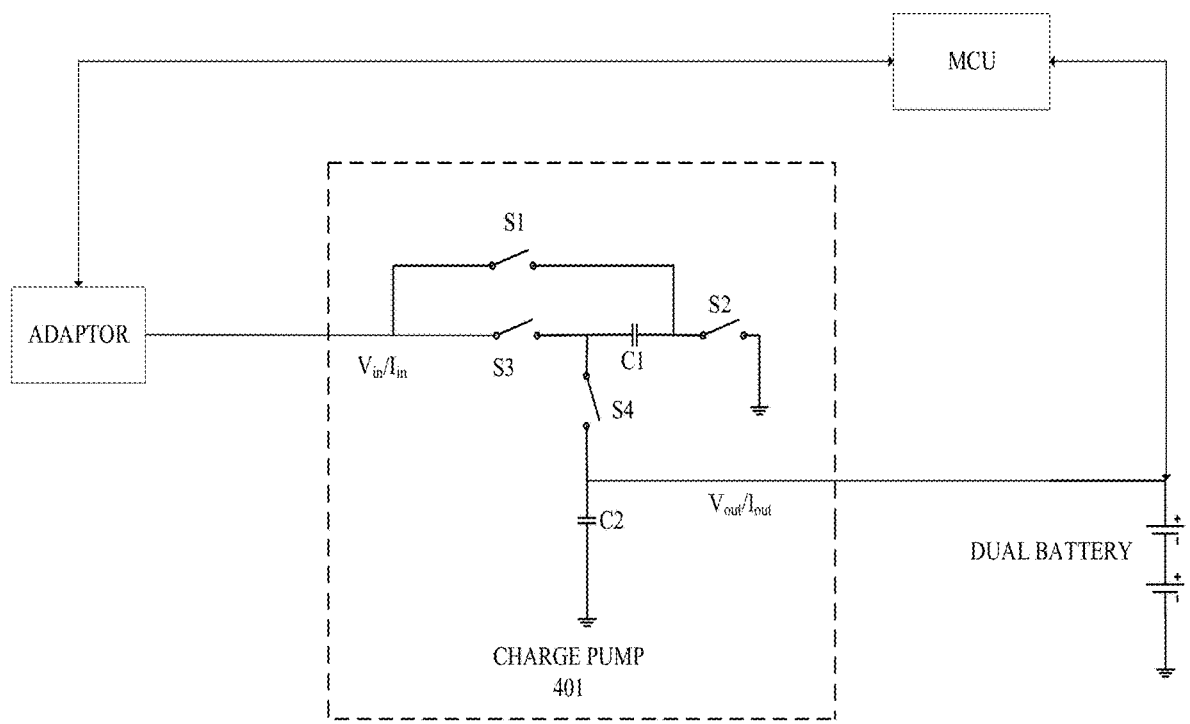
FIG. 4 is a schematic structural diagram of a charging circuit for an electronic device according to other implementations.

Based on this, according to implementations, in an example, charging of dual battery is performed by a 5V Voltage Open Loop Multi-step Constant-Current Charging ("VOOC") adaptor along with a voltage doubler charge pump. As illustrated in FIG. 4, the input voltage of the charge pump is $V_{in}$, an input current of the charge pump is $I_{in}$, the output voltage of the charge pump is $V_{out}$, and an output current of the charge pump is $I_{out}$. A charge pump 401 has an output end coupled with a positive electrode of the dual battery and has an input end coupled with an output end of the adaptor. An MCU continuously monitors a state of the dual battery and informs the state of the dual battery to the adaptor. The adaptor adjusts its own output according to the state of the dual battery. When the charge pump 401 is operable with the adaptor for direct charging with low voltage, switches S1, S2, S3, and S4 in the charge pump 401 are switched on or switched off at a 50% duty cycle. It should be noted that, the charge pump illustrated in FIG. 4 and the charge pump illustrated in FIG. 3 have the same circuit structure as the charge pump illustrated in FIG. 2A to FIG. 2D and therefore will not be described in detail herein again.

Based on boost conversion principles of the charge pump (that is, working principles of the charge pump when the charge pump is operable with the adaptor for direct charging with low voltage), without taking conversion efficiency into consideration, $V_{out}=2*V_{in}$ and $I_{out}=I_{in}/2$.

When coupled with the adaptor for direct charging with low voltage, the charge pump 401 is in the boost conversion mode. When coupled with the adaptor for direct charging with high voltage, S3 and S4 in the charge pump 401 are in an on-state and S1 and S2 are in an off-state, and here, the charge pump is in the bypass mode, in which the output voltage of the adaptor is directly applied to the input end of the dual battery for direct charging. In this way, direct charging with high voltage is achieved with the charge pump 401, which can not only decrease the number of devices required for the charging circuit but also improve charging efficiency of the charging circuit.

Figure 5:
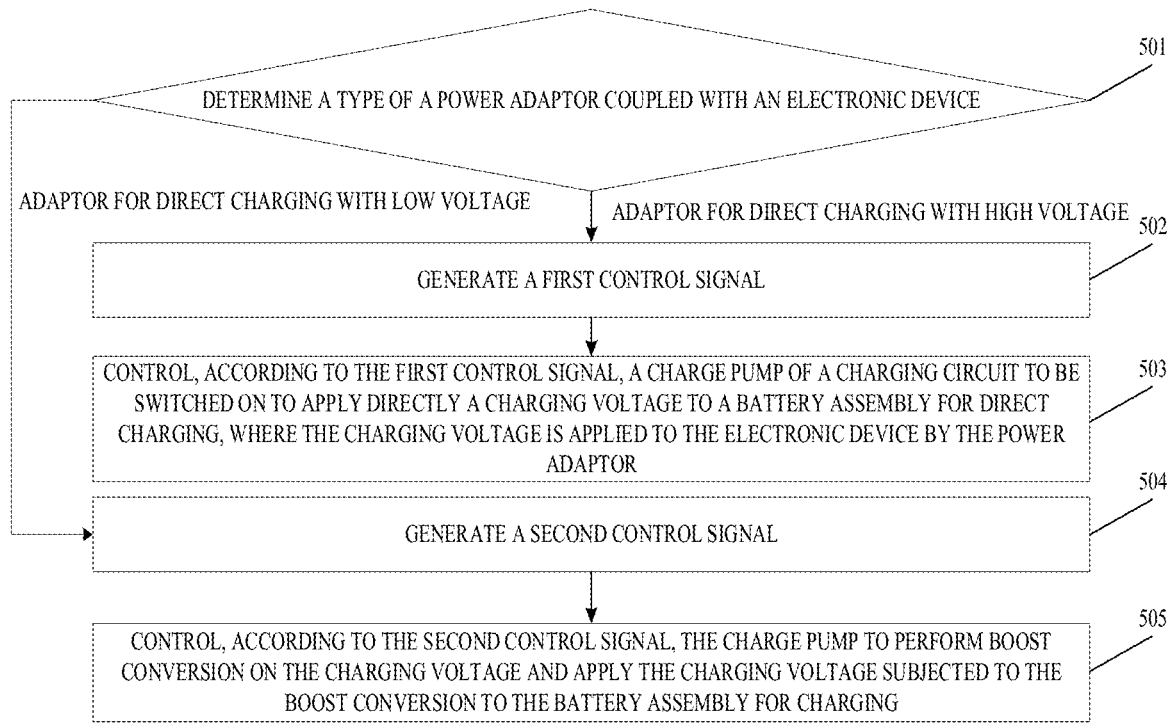
FIG. 5 is a schematic flowchart of a charging method according to implementations.

Based on the foregoing implementations, a charging method is provided. FIG. 5 is a schematic flowchart of a charging method according to implementations. As illustrated in FIG. 5, the method can include operations at step 501 to step 505.

At step 501, a type of a power adaptor coupled with an electronic device is determined. If the power adaptor is an adaptor for direct charging with high voltage, then the method proceeds to operations at step 502. If the power adaptor is an adaptor for direct charging with low voltage, the method proceeds to operations at step 504.

In some implementations, the type of the power adaptor can be determined by detecting whether a charging voltage applied to the electronic device by the power adaptor is higher than a preset threshold voltage. For example, if the charging voltage is higher than the preset threshold voltage, the power adaptor is determined to be an adaptor for direct charging with high voltage. If the charging voltage is lower than or equal to the preset threshold voltage, the power adaptor is determined to be an adaptor for direct charging with low voltage.

At step 502, a first control signal is generated, and the method proceeds to operations at step 503.

The first control signal is used for controlling a charge pump of a charging circuit to be switched on to directly apply the charging voltage to a battery assembly for direct charging, where the battery assembly includes at least one cell.

At step 503, the charge pump of the charging circuit is controlled, according to the first control signal, to be switched on to directly apply the charging voltage to the battery assembly for direct charging.

At step 504, a second control signal is generated, and proceed to operations at step 505.

The second control signal can control the charge pump to perform boost conversion on the charging voltage and apply the charging voltage subjected to the boost conversion to the battery assembly for charging.

At step 505, the charge pump is controlled, according to the second control signal, to perform boost conversion on the charging voltage and apply the charging voltage subjected to the boost conversion to the battery assembly for charging.

In some implementations, for operations at step 503, the charge pump is controlled, according to the first control signal, to be switched on to directly apply the charging voltage to the battery assembly for direct charging as follows. M switch components in the charge pump are switched on according to the first control signal, such that the charging voltage passes through the M switch components to be applied to the battery assembly for direct charging, where the M switch components are located between the power adaptor and the battery assembly, and M is an integer greater than or equal to one.

Take the charging circuit 20 illustrated in FIG. 2A as an example. As illustrated in FIG. 2B, upon receiving the first control signal, the charge pump 202 switches off the first switch component S1 and the second switch component S2, and switches on the third switch component S3 and the fourth switch component S4 according to the first control signal, such that the charging voltage passes through the third switch component S3 and the fourth switch component S4 to be applied to the battery assembly 203 for direct charging.

In some implementations, for operations at step 505, the charge pump is controlled, according to the second control signal, to perform boost conversion on the charging voltage and apply the charging voltage subjected to the boost conversion to the battery assembly for charging as follows. Boost conversion is performed on the charging voltage according to the second control signal by using capacitor components in the charge pump and alternately switching on N switch components in the charge pump, in such a manner that an output voltage of the charge pump is higher than the charging voltage, where N is an integer greater than or equal to one. The output voltage is applied to the battery assembly for charging.

Take the charging circuit 20 illustrated in FIG. 2A as an example. The third switch component S3 and the second switch component S2 can be used as a first set of components, and the first switch component S1 and the fourth switch component S4 can be used as a second set of components. As illustrated in FIG. 2C and FIG. 2D, upon receiving the second control signal, the charge pump 202 alternately switches on the first set of components and the second set of components at a preset time interval according to the second control signal such that the output voltage of the charge pump 202 is higher than the charging voltage. Then the charge pump 202 applies the output voltage to the battery assembly for charging.

It should be noted that, according to implementations, if the above charging method is implemented as software functional units and sold or used as standalone products, it may be stored in a computer readable storage medium. Based on such an understanding, the essential technical solution, or the portion that contributes to the prior art may be embodied as software products. The computer software products can be stored in a storage medium and may include multiple instructions that, when executed, can cause an electronic device, e.g., a mobile phone, a tablet computer, a desktop, a PDA, a GPS, a digital telephone, a video telephone, a television, a sensor device, etc. to execute some or all operations of the methods described in various implementations. The above storage medium may include various kinds of media that can store program codes, such as, for example, a USB flash disk, a mobile hard drive, a read only memory (ROM), a magnetic disk, or an optical disk. Therefore, there is not particular restriction on the combination of hardware and software in implementations.

Figure 6:
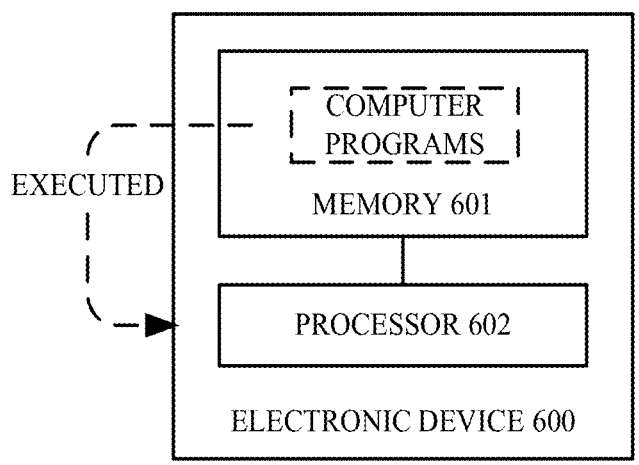
FIG. 6 is a schematic diagram illustrating hardware of an electronic device according to implementations.

Based on the above, an electronic device is provided. FIG. 6 is a schematic diagram illustrating hardware of an electronic device according to implementations. As illustrated in FIG. 6, the electronic device 600 includes a memory 601 and a processor 602. The memory 601 is configured to store computer programs which, when executed by the processor 602, are operable with the processor 602 to perform the charging method described in the foregoing implementations.

The memory 601 is configured to store instructions and applications operable with the processor 602 and may also cache data (such as, for example, image data, audio data, voice communication data, and video communication data) to be processed or processed by various modules in the processor 602 and the electronic device 600. The memory 601 may be implemented as flash memory or a random access memory (RAM).

Based on the above, a computer readable storage medium is provided. The computer readable storage medium is configured to store computer programs which, when executed by a processor, are operable with the processor to perform the charging method described in the foregoing implementations.

It should be noted that, description of the above storage medium implementations and device implementations is similar to that of the foregoing method implementations, and has similar advantages to the method implementations. For technical details not disclosed in the storage medium implementations and the device implementations, reference can be made to the description of the method implementations for understanding.

The reference term "one implementation" or "an implementation" referred to herein means that a particular feature, structure, or characteristic described in conjunction with the implementation may be contained in at least one implementation. Therefore, the phrase "in one implementation" or "in an implementation" appearing in various places in the specification does not necessarily refer to the same implementation. In addition, the particular feature, structure, or characteristic described may be properly combined in any one or more implementations. It can be understood that, in various implementations of the disclosure, the sequence numbers of the above steps do not represent the order of execution. Instead, the execution order of each step should be determined by its function and internal logic, and should not constitute any limitation on the implementation process of the implementations. The sequence numbers of the foregoing implementations are only for description, and do not represent the superiority or inferiority of the implementations.

It should be noted that, the terms "including", "comprising", "having" or any other variants thereof are intended to cover non-exclusive inclusion, so that a process, method, object, or device including a series of elements includes not only those elements but also other elements not explicitly listed, or elements inherent to such a process, method, object, or device. Without other restrictions, an element limited by the sentence "including a . . . " does not exclude the possibility that there are other identical elements in the process, method, object, or device that includes the elements.

It will be appreciated that the apparatuses, and methods disclosed in implementations herein may also be implemented in various other manners. For example, the above apparatus implementations are merely illustrative, e.g., the division of units is only a division of logical functions, and there may exist other manners of division in practice, e.g., multiple units or assemblies may be combined or may be integrated into another system, or some features may be ignored or skipped. In other respects, the coupling or direct coupling or communication connection as illustrated or discussed may be an indirect coupling or communication connection through some interface, device, or unit, and may be electrical, mechanical, or otherwise. Separated units as illustrated may or may not be physically separated. Components displayed as units may or may not be physical units, and may reside at one location or may be distributed to multiple networked units. Some or all of the units may be selectively adopted according to practical needs to achieve desired objectives of the disclosure.

Various functional units described in implementations herein may be integrated into one processing unit or may be present as a number of physically separated units, and two or more units may be integrated into one. The integrated unit may take the form of hardware or hardware plus software functional unit.

Those of ordinary skill in the art can understand that all or part of the steps of implementing the foregoing method implementations may be implemented by a program instructing related hardware. The program referred to herein may be stored in a computer-readable storage medium. When the program is executed, the steps including the foregoing method implementations are executed. The storage medium includes various kinds of media that can store program codes, such as, for example, a portable storage device, a ROM, a magnetic disk, or an optical disk.

If the integrated units are implemented as software functional units and sold or used as standalone products, they may be stored in a computer readable storage medium. Based on such an understanding, the essential technical solution, or the portion that contributes to the prior art may be embodied as software products. The computer software products can be stored in a storage medium and may include multiple instructions that, when executed, can cause an electronic device, e.g., a mobile phone, a tablet computer, a desktop, a PDA, a GPS, a digital telephone, a video telephone, a television, a sensor device, etc. to execute some or all operations of the methods described in various implementations. The above storage medium may include various kinds of media that can store program codes, such as a portable storage device, a ROM, a magnetic disk, or an optical disk.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

INDUSTRIAL APPLICABILITY

Implementations provide a charging circuit for an electronic device. During charging of a battery assembly of the charging circuit performed by a power adaptor electrically coupled with the electronic device, if the power adaptor is an adaptor for direct charging with high voltage, a charging voltage applied to the electronic device by the power adaptor passes through a charge pump to be applied directly to the battery assembly for direct charging, which is possible to decrease the number of devices needed for the charging circuit, thereby improving charging efficiency.

What is claimed is:

1. A charging circuit for an electronic device, comprising:
   a control module configured to generate a first control signal upon determining that a power adaptor connected is an adaptor for direct charging with high voltage, and generate a second control signal upon determining that the power adaptor connected is an adaptor for direct charging with low voltage; and
   a charge pump configured to directly apply a charging voltage to a battery assembly of the electronic device for direct charging according to the first control signal, and perform boost conversion on the charging voltage and apply the charging voltage subjected to the boost conversion to the battery assembly for charging according the second control signal, wherein the charging voltage is applied to the electronic device by the power adaptor;
   wherein the charge pump comprises N switch components and is configured to switch on M among the N switch components upon receiving the first control signal, such a that the charging voltage passes through the M switch components to be applied to the battery assembly for direct charging, wherein a charging path for direct charging comprising the M switch components is part of a charging path for boost-charging comprising the N switch components, M and N are positive integers and M≤N.

2. The charging circuit of claim 1, wherein the adaptor for direct charging with low voltage has a maximum output voltage lower than the adaptor for direct charging with high voltage.

3. The charging circuit of claim 2, wherein the charge pump further comprises at least one capacitor component; and
   wherein the charge pump is configured to:
   perform boost conversion on the charging voltage by using the at least one capacitor component and alternately switching on the N switch components, such that an output voltage of the charge pump is higher than the charging voltage, upon receiving the second control signal; and
   apply the output voltage to the battery assembly for charging, wherein N is an integer greater than or equal to one.

4. The charging circuit of claim 2, wherein the N switch components comprise a first switch component, a second switch component, a third switch component, a fourth switch component, a first capacitor component, and a second capacitor component, wherein:
   an input end of the first switch component and an input end of the third switch component are used as an input end of the charge pump;
   an output end of the first switch component is coupled with an input end of the second switch component, and an output end of the second switch component is grounded;
   an output end of the third switch component is coupled with an input end of the first capacitor component and an input end of the fourth switch component respectively;
   an output end of the first capacitor component is coupled with the input end of the second switch component;
   an output end of the fourth switch component is used as an output end of the charge pump and is coupled with an input end of the second capacitor component and a positive electrode of the battery assembly respectively; and
   an output end of the second capacitor component is grounded, and a negative electrode of the battery assembly is grounded.

5. The charging circuit of claim 4, wherein the charge pump is configured to:
   switch off the first switch component and the second switch component and switch on the third switch component and the fourth switch component upon receiving the first control signal, such that the charging voltage passes through the third switch component and the fourth switch component to be applied to the battery assembly for direct charging.

6. The charging circuit of claim 4, wherein:
   the third switch component and the second switch component are a first set of components, and the first switch component and the fourth switch component are a second set of components; and the charge pump is configured to:
alternately switch on the first set of components and the second set of components at a preset time interval such that an output voltage of the charge pump is higher than the charging voltage, upon receiving the second control signal; and
apply the output voltage to the battery assembly for charging.

7. The charging circuit of claim 2, wherein the control module is further configured to:
determine that the power adaptor is the adaptor for direct charging with high voltage upon detecting that the charging voltage is higher than a preset threshold voltage; and
determine that the power adaptor is the adaptor for direct charging with low voltage upon detecting that the charging voltage is lower than or equal to the preset threshold voltage.

8. A charging method, comprising:
determining a type of a power adaptor coupled with an electronic device, wherein the type comprises: an adaptor for direct charging with high voltage, and an adaptor for direct charging with low voltage;
generating a first control signal upon determining that the power adaptor is the adaptor for direct charging with high voltage, and generating a second control signal upon determining that the power adaptor is the adaptor for direct charging with low voltage; and
controlling, according to the first control signal, a charge pump of a charging circuit to be switched on to directly apply a charging voltage to a battery assembly for direct charging, and controlling, according to the second control signal, the charge pump to perform boost conversion on the charging voltage and apply the charging voltage subjected to the boost conversion to the battery assembly for charging, wherein the charging voltage is applied to the electronic device by the power adaptor;
wherein the charge pump comprises N switch components, and controlling, according to the first control signal, the charge pump to be switched on comprises: controlling to switch on M among the N switch components upon receiving the first control signal, such a that the charging voltage passes through the M switch components to be applied to the battery assembly for direct charging, wherein a charging path for direct charging comprising the M switch components is part of a charging path for boost-charging comprising the N switch components, M and N are positive integers and M≤N.

9. The method of claim 8,
wherein the M switch components are located between the power adaptor and the battery assembly.

10. The method of claim 9, wherein switching on the M switch components in the charge pump according to the first control signal such that the charging voltage passes through the M switch components to be applied to the battery assembly for direct charging comprises:
according to the first control signal, switching off a first switch component and a second switch component in the charge pump and switching on a third switch component and a fourth switch component in the charge pump, such that the charging voltage passes through the third switch component and the fourth switch component to be applied to the battery assembly for direct charging, wherein:

an input end of the first switch component and an input end of the third switch component are used as an input end of the charge pump;
an output end of the first switch component is coupled with an input end of the second switch component, and an output end of the second switch component is grounded;
an output end of the third switch component is coupled with an input end of a first capacitor component and an input end of the fourth switch component respectively;
an output end of the first capacitor component is coupled with the input end of the second switch component;
an output end of the fourth switch component is used as an output end of the charge pump and is coupled with an input end of a second capacitor component and a positive electrode of the battery assembly respectively; and
an output end of the second capacitor component is grounded, and a negative electrode of the battery assembly is grounded.

11. The method of claim 8, wherein controlling, according to the second control signal, the charge pump to perform boost conversion on the charging voltage and apply the charging voltage subjected to the boost conversion to the battery assembly for charging comprises:
performing, according to the second control signal, boost conversion on the charging voltage by using capacitor components in the charge pump and alternately switching on the N switch components in the charge pump, such that an output voltage of the charge pump is higher than the charging voltage; and
applying the output voltage to the battery assembly for charging.

12. The method of claim 11, wherein performing, according to the second control signal, boost conversion on the charging voltage by using the capacitor components in the charge pump and alternately switching on the N switch components in the charge pump, such that the output voltage of the charge pump is higher than the charging voltage comprises:
according to the second control signal, alternately switching on a first set of components and a second set of components in the charge pump at a preset time interval such that the output voltage of the charge pump is higher than the charging voltage, wherein the first set of components comprises a third switch component and a second switch component, and the second set of components comprises a first switch component and a fourth switch component, wherein:
an input end of the first switch component and an input end of the third switch component are used as an input end of the charge pump;
an output end of the first switch component is coupled with an input end of the second switch component, and an output end of the second switch component is grounded;
an output end of the third switch component is coupled with an input end of a first capacitor component and an input end of the fourth switch component respectively;
an output end of the first capacitor component is coupled with the input end of the second switch component;
an output end of the fourth switch component is used as an output end of the charge pump and is coupled with an input end of a second capacitor component and a positive electrode of the battery assembly respectively; and an output end of the second capacitor component is grounded, and a negative electrode of the battery assembly is grounded.

13. The method of claim 8, wherein determining the type of the power adaptor comprises:

determining that the power adaptor is the adaptor for direct charging with high voltage upon detecting that the charging voltage is higher than a preset threshold voltage; and determining that the power adaptor is the adaptor for direct charging with low voltage upon detecting that the charging voltage is lower than or equal to the preset threshold voltage.

14. An electronic device, comprising:

a battery assembly;

a control module configured to determine a type of a power adaptor connected with the electronic device, generate a first control signal upon determining that the power adaptor connected is an adaptor for direct charging with high voltage, and generate a second control signal upon determining that the power adaptor connected is an adaptor for direct charging with low voltage, wherein the type comprises: the adaptor for direct charging with high voltage, and an adaptor for direct charging with low voltage; and a charge pump configured to directly apply a charging voltage from the power adaptor to the battery assembly for direct charging according to the first control signal, and perform boost conversion on the charging voltage and apply the charging voltage subjected to the boost conversion to the battery assembly for charging according to the second control signal, wherein the charging voltage is applied to the electronic device by the power adaptor;

wherein the charge pump comprises N switch components and is configured to switch on M among the N switch components upon receiving the first control signal, such that the charging voltage passes through the M switch components to be applied to the battery assembly for direct charging, wherein a charging path for direct charging comprising the M switch components is part of a charging path for boost-charging comprising the N switch components, M and N are positive integers and M≤N.

15. The electronic device of claim 14, wherein the adaptor for direct charging with low voltage has a maximum output voltage lower than the adaptor for direct charging with high voltage.

16. The electronic device of claim 15, wherein the charge pump is configured to:

perform boost conversion on the charging voltage by using capacitor components in the charge pump and alternately switching on the N switch components, such that an output voltage of the charge pump is higher than the charging voltage, upon receiving the second control signal; and apply the output voltage to the battery assembly for charging, wherein N is an integer greater than or equal to one.

17. The electronic device of claim 15, wherein the N switch components comprise a first switch component, a second switch component, a third switch component, a fourth switch component, a first capacitor component, and a second capacitor component, wherein:

an input end of the first switch component and an input end of the third switch component are used as an input end of the charge pump;

an output end of the first switch component is coupled with an input end of the second switch component, and an output end of the second switch component is grounded;

an output end of the third switch component is coupled with an input end of the first capacitor component and an input end of the fourth switch component respectively;

an output end of the first capacitor component is coupled with the input end of the second switch component;

an output end of the fourth switch component is used as an output end of the charge pump and is coupled with an input end of the second capacitor component and a positive electrode of the battery assembly respectively; and an output end of the second capacitor component is grounded, and a negative electrode of the battery assembly is grounded, wherein:

the charge pump is configured to switch off the first switch component and the second switch component and switch on the third switch component and the fourth switch component upon receiving the first control signal, such that the charging voltage passes through the third switch component and the fourth switch component to be applied to the battery assembly for direct charging.

* * * * *